United States Patent
Jeong et al.

(10) Patent No.: US 6,937,954 B2
(45) Date of Patent: Aug. 30, 2005

(54) SIGNAL PROCESSOR FOR USE IN ELECTRONIC COMPASS

(75) Inventors: Ha Woong Jeong, Inchun (KR); Won Tae Choi, Kyungki-do (KR); Han Chul Jo, Kyungki-do (KR); Jin Yong Kang, Suwon (KR); Chang Hyun Kim, Kyungki-do (KR); Oh Jo Kwon, Suwon (KR)

(73) Assignee: Samsung Electro-Mechanics Co., Ltd, Kyungki-do (KR)

( * ) Notice: Subject to any disclaimer, the term of this patent is extended or adjusted under 35 U.S.C. 154(b) by 28 days.

(21) Appl. No.: 10/660,608

(22) Filed: Sep. 12, 2003

(65) Prior Publication Data

US 2004/0267505 A1 Dec. 30, 2004

(30) Foreign Application Priority Data

Jun. 24, 2003 (KR) ................. 10-2003-0041285

(51) Int. Cl.⁷ .......... G01C 17/38; G01P 21/00; G06F 19/00
(52) U.S. Cl. ............... 702/92; 702/32; 33/356
(58) Field of Search ............ 702/32, 92; 33/356, 33/361, 333, 340, 27.02, 271, 27, 316, 319, 324, 352; 324/252, 207.1; 327/511, 252; 333/319

(56) References Cited

U.S. PATENT DOCUMENTS

| 5,216,816 A | * | 6/1993 | Ida .................. 33/356 |
| 5,394,029 A | * | 2/1995 | Gay et al. ............ 327/511 |
| 6,242,907 B1 | * | 6/2001 | Clymer et al. ...... 324/207.17 |
| 6,427,349 B1 |   | 8/2002 | Blank et al. |
| 6,466,871 B1 | * | 10/2002 | Reisman et al. ......... 701/224 |
| 6,842,991 B2 | * | 1/2005 | Levi et al. ............. 33/356 |
| 6,871,411 B1 | * | 3/2005 | Kang et al. ............ 33/356 |
| 2004/0020064 A1 | * | 2/2004 | Levi et al. ............ 33/319 |
| 2004/0187328 A1 | * | 9/2004 | Satoh et al. ........... 33/356 |

* cited by examiner

Primary Examiner—Michael Nghiem
Assistant Examiner—Aditya Bhat
(74) Attorney, Agent, or Firm—Lowe Hauptman & Berner, LLP

(57) ABSTRACT

In a signal processor for use in an electronic compass for controlling an offset voltage generated in an analog signal process and automatically controlling an amplification gain, an analog signal processor 52 amplifies signals Sx and Sy, and controls an offset voltage and amplitude A generated during an amplification process. An analog/digital (AD) converter 53 converts analog signals Vadcx and Vadcy from the analog signal processor 52 into a digital signal. A digital signal processor 54 measures a maximum value $V_{adc\_max}$ and a minimum value $V_{adc\_min}$ associated with the digital signal from the AD converter 53, and outputs, to the analog signal processor 52, an offset control signal Soc and a gain control signal Sgc based on the maximum value $V_{adc\_max}$ and minimum value $V_{adc\_min}$. The signal processor can maintain levels of signals, to be inputted into the AD converter, to be within a reference voltage range.

15 Claims, 10 Drawing Sheets

After offset calibration

Azimuth-angle
error occurrence

After offset calibration

Azimuth-angle
error occurrence

SIGNAL PROCESSOR FOR USE IN ELECTRONIC COMPASS

BACKGROUND OF THE INVENTION

1. Field of the Invention

The present invention relates to a signal processor or integrated circuit for use in an electronic compass, and more particularly to a signal processor for use in an electronic compass, which can maintain levels of signals to be inputted into an analog/digital (AD) converter through offset and gain control operations within a reference voltage range by controlling an offset voltage generated while processing analog signals and automatically controlling a signal amplification gain, be applicable to performing a tilt compensation operation for a sensor, improve sensor performance by carrying out a gain control operation for signals from a geomagnetic compass sensor and minimize an error when calculating an azimuth angle.

2. Description of the Related Art

Conventionally, an azimuth angle used for identifying a ship route or position is of the utmost importance to ship navigation. The azimuth angle has been measured using a magnet pointing to the magnetic north for the past several hundred years. Representative devices for measuring the azimuth angle include a magnetic compass and a gyrocompass. The magnetic compass is a device for measuring the azimuth angle using properties of the earth's magnetic field. The principle of the magnetic compass is simple, but the precision of the magnetic compass may be degraded due to the distortion of the earth's magnetic field. In particular, internal and external functions associated with small-sized excursion ships or small-sized fishing boats have been recently modernized. However, there are problems in that the functions of the ships or boats are still insufficient and other electronic devices contained in the ships or boats cannot use stem angle information obtained from the magnetic compass.

Furthermore, as another azimuth measuring device, the gyrocompass is used. The precision of the gyrocompass is remarkably higher than that of the magnetic compass, but there are problems in that the gyrocompass is expensive and inappropriate to small-sized fishing boats and yachts that must frequently come in to and go out of a port or harbor. To address the above-described problems, an electro magnetic compass was developed. This electro magnetic compass was commercialized and used in Europe and America a long time ago.

The electro magnetic compass (hereinafter, referred to as an "electronic compass") basically includes a sensor for detecting a magnetic field azimuth and converting the detected azimuth into an electric signal, a signal processor for calculating an azimuth angle on the basis of the signal from the sensor and a display unit for displaying the azimuth angle. The sensor for detecting the magnetic field azimuth uses a flux valve, and the flux valve uses a set of X-Y orthogonal coils called a flux gate. The signal processor calculates the azimuth angle. The display unit displays the calculated azimuth angle.

The conventional signal processor for use in the electronic compass is shown in FIG. 1.

Referring to FIG. 1, the conventional signal processor for use in the electronic compass includes a geomagnetic compass sensor 11 for detecting voltages of sine or cosine wave signals induced by a drive signal according to a rotating angle of a flux-gate sensor; an analog signal processor 12 for filtering and amplifying x-axis and y-axis signals Sx and Sy from the geomagnetic compass sensor 11; an analog/digital (AD) converter 13 for converting voltages Vadcx and Vadcy from the AD converter 13 into a set of digital signals; and a digital signal processor 14 for detecting an azimuth angle from the set of digital signals outputted by the AD converter 13.

FIG. 2 is a waveform diagram illustrating input signals inputted into the AD converter 13 shown in FIG. 1.

Referring to FIG. 2, the two voltages Vadcx and Vadcy inputted into the AD converter 13 are ideally within a reference voltage range (e.g., a range of ±500 mV). The digital signal processor 14 produces an azimuth angle θ using the two voltages Vadcx and Vadcy according to the following Equation 1.

$$\theta = \tan^{-1}\left(\frac{Vadcy}{Vadcx}\right) \quad \text{Equation 1}$$

However, where a sensor leans to one side as it is put on an uneven plane, there is a problem in that the amplitude of the voltage $V_{adc}$ (Vadcx or Vadcy) inputted into the AD converter 13 is out of the reference voltage range. Also where an offset voltage occurs within the analog signal processor, there is the problem in that the amplitude of the voltage $V_{adc}$ (Vadcx or Vadcy) inputted into the AD converter 13 is out of the reference voltage range.

In the conventional method, signal amplitude cannot be appropriately adjusted since the analog signal processor is based on a fixed amplification gain. In relation to the conventional method, the offset voltage occurs within the analog signal processor and also when an intensity of the earth's magnetic field varies with the environment in which it is used. When the input signal for the AD converter deviates from an allowable input range, an azimuth-angle calculation error increases.

Where an offset associated with at least one voltage of the two voltages occurs or one voltage has an amplitude higher than the other voltage, related problems occur, and will be described with reference to FIGS. 3(a), 3(b) and 3(c) and FIGS. 4(a), 4(b) and 4(c).

FIGS. 3(a), 3(b) and 3(c) are waveform diagrams illustrating an offset occurrence, offset calibration and azimuth-angle error occurrence associated with input signals.

Where an offset associated with the input signals occurs as shown in FIG. 3(a), the offset calibration for the input signals is carried out as shown in FIG. 3(b). In this case, it can be found that an azimuth-angle error occurs as shown in FIG. 3(c).

In other words, where an offset voltage occurs within the analog signal processor, a voltage $V_{adc}$ deviating from the allowable input range for the AD converter can be outputted as shown in FIG. 3(a). At this time, the digital signal processor carries out a calibration operation for the voltage $V_{adc}$ deviating from the allowable input range so that the same signal amplitudes can be maintained for the azimuth-angle calculation. As shown in FIG. 3(b), the voltage $V_{adc}$ deviating from the allowable input range for the AD converter is cancelled out. When the azimuth angle is calculated by the above Equation 1, the azimuth-angle error occurs as shown in FIG. 3(c). This error is increased as the voltage $V_{adc}$ deviating from the allowable input range for the AD converter is increased.

FIGS. 4(a), 4(b) and 4(c) are waveform diagrams illustrating gain error occurrence, error correction and azimuth-angle error occurrence associated with the input signals.

Where amplitude of the input signal is very large or very small as shown in FIG. 4(a), the amplitude is corrected as shown in FIG. 4(b). In this case, it can be found that an azimuth-angle error occurs as shown in FIG. 4(c).

Where the amplitude of a signal generated from the sensor is very large or an amplification gain of the analog signal processor is set to be very large in the conventional signal processor, the voltage $V_{adc}$ as shown in FIG. 4(a) can be outputted. In this case, although the offset voltage does not occur, an error occurs as shown in FIG. 4(c) when the signal amplitude deviates from the allowable input range for the AD converter as shown in FIG. 4(a).

A system offset cannot be completely cancelled out without a separate control operation in the conventional method. Since levels of signals from the sensor are not constant, the azimuth-angle error causes the above-described problems.

SUMMARY OF THE INVENTION

Therefore, the present invention has been made in view of the above problems, and it is an object of the present invention to provide a signal processor for use in an electronic compass, which can maintain levels of signals to be inputted into an analog/digital (AD) converter through offset and gain control operations within a reference voltage range by controlling an offset voltage generated while processing analog signals and automatically controlling a signal amplification gain, be applicable to performing a tilt compensation operation for a sensor, improve sensor performance by carrying out a gain control operation for signals from a geomagnetic compass sensor and minimize an error when calculating an azimuth angle.

In accordance with an aspect of the present invention, the above and other objects can be accomplished by the provision of a signal processor for use in an electronic compass for processing signals from a geomagnetic compass sensor detecting sine or cosine wave signals induced by a drive signal according to an azimuth angle, comprising:

an analog signal processor for amplifying the signals from the geomagnetic compass sensor, canceling an offset voltage generated during an amplification process in response to an offset control signal, and controlling an amplitude of a signal in which the offset voltage is cancelled out in response to a gain control signal;

an analog/digital (AD) converter for converting analog signals from the analog signal processor into a digital signal; and a digital signal processor for measuring a maximum value and a minimum value associated with the digital signal from the AD converter, deciding the offset voltage and the amplitude on the basis of the maximum and minimum values, and outputting, to the analog signal processor, the offset control signal to be used for canceling the decided offset voltage and the gain control signal to be used for controlling the decided amplitude such that it lies within an allowable input range for the AD converter.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
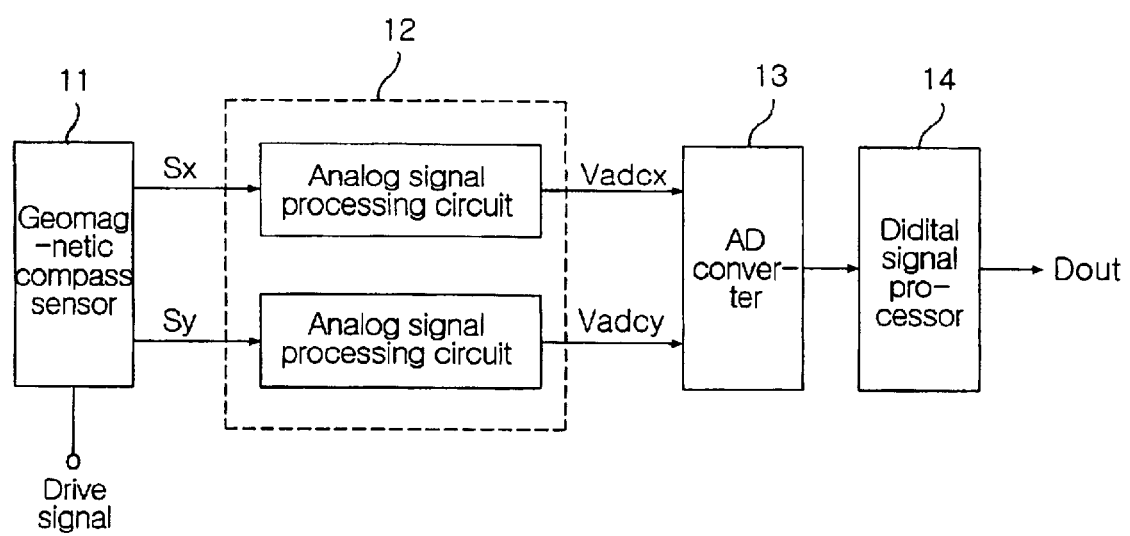
FIG. 1 is a block diagram illustrating a conventional signal processor for use in an electronic compass.
Figure 2:
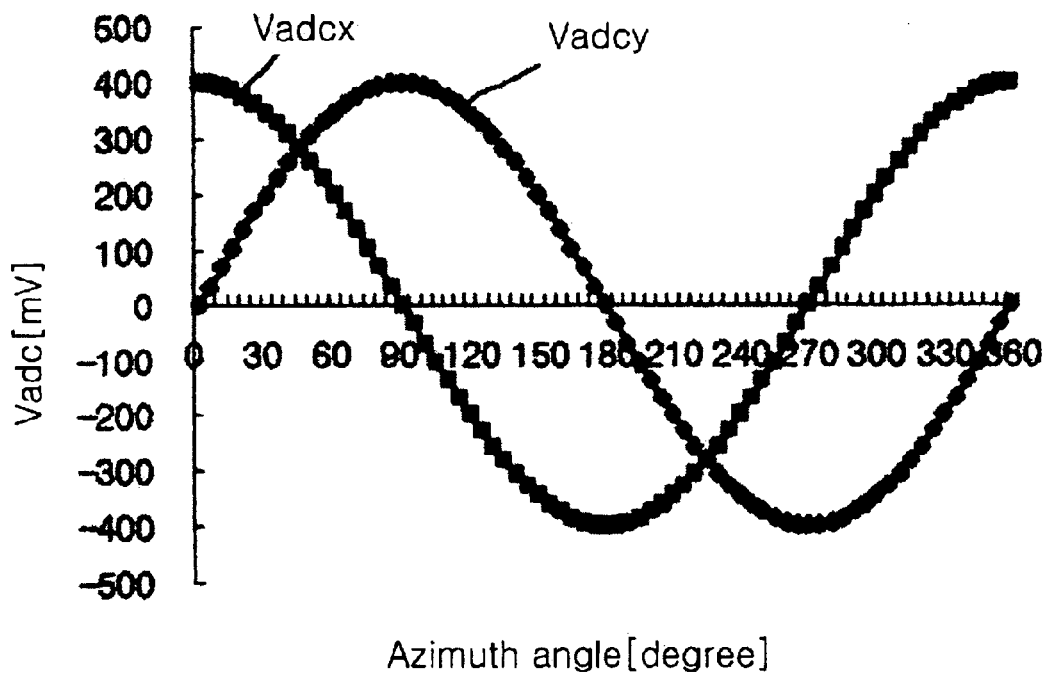
FIG. 2 is a waveform diagram illustrating input signals inputted into an AD converter 13 shown in FIG. 1.

Now, preferred embodiments in accordance with the present invention will be described in detail with reference to the accompanying drawings. In the drawings, the same or similar elements are denoted by the same reference numerals even though they are depicted in different drawings.

Figure 5:
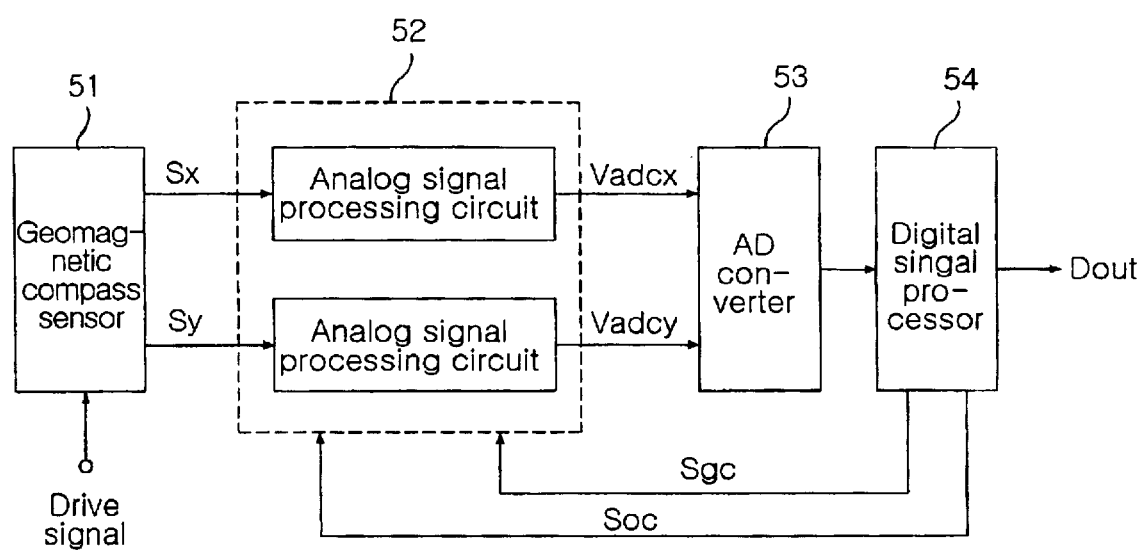
FIG. 5 is a block diagram illustrating the configuration of a signal processor for use in an electronic compass in accordance with the present invention.

FIG. 5 is a block diagram illustrating the configuration of a signal processor for use in an electronic compass in accordance with the present invention.

Referring to FIG. 5, the signal processor for use in the electronic compass of the present invention processes signals from a geomagnetic compass sensor 51 detecting sine or cosine wave signals induced by a drive signal according to an azimuth angle. The signal processor includes an analog signal processor 52 for amplifying signals Sx and Sy, canceling an offset voltage Vos generated during an amplification process in response to an offset control signal Soc, and controlling amplitude A of a signal in which the offset voltage Vos is cancelled out in response to a gain control signal Sgc; an analog/digital (AD) converter 53 for converting analog signals $V_{adc}$ (Vadcx and Vadcy) from the analog signal processor 52 into a digital signal; and a digital signal processor 54 for measuring maximum and minimum values associated with the digital signal from the AD converter 53, deciding the offset voltage Vos and the amplitude A on the basis of the maximum and minimum values, and outputting, to the analog signal processor 52, the offset control signal Soc to be used for canceling the decided offset voltage Vos and the gain control signal Sgc to be used for controlling the decided amplitude A such that it lies within the allowable input range for the AD converter 53.

Figure 6:
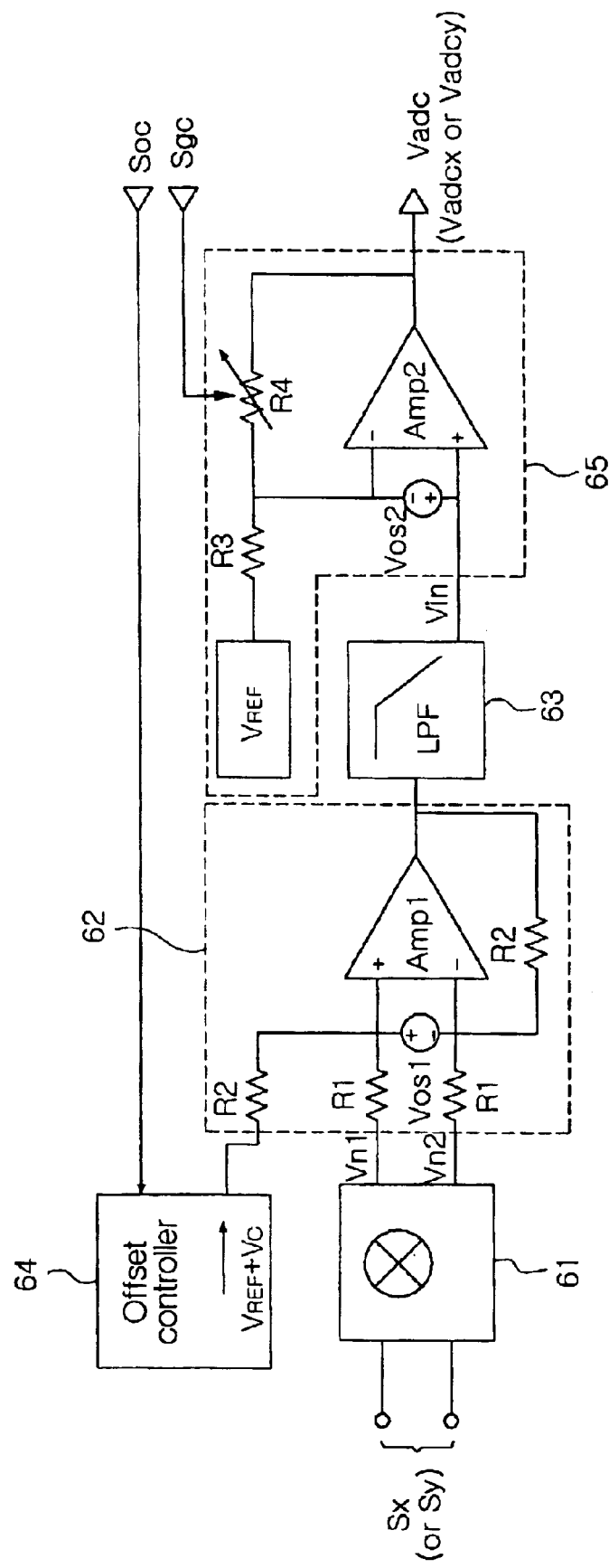
FIG. 6 is a circuit diagram illustrating the configuration of an analog signal processing circuit of an analog signal processor in accordance with the present invention.

FIG. 6 is a circuit diagram illustrating the configuration of an analog signal processing circuit of the analog signal processor 52 in accordance with the present invention.

Referring to FIG. 6, the analog signal processing circuit of the analog signal processor 52 includes a chopper 61 for detecting signals Sx or Sy from the geomagnetic compass sensor 51; an input amplifier 62 for amplifying the detected signals outputted from the chopper 61 on the basis of a preset gain; a low pass filter 63 for carrying out a preset low pass filtering operation for a signal outputted from the input amplifier 62; an offset controller 64 for generating a voltage $V_{REF}+V_c$ for canceling the offset in response to the offset control signal Soc and providing the generated voltage $V_{REF}+V_c$ to input terminals of the input amplifier 62; and an automatic gain control (AGC) amplifier 65 for setting an amplification gain Av in response to the gain control signal Sgc and amplifying a signal from the low pass filter 63 in response to the set gain Av.

The digital signal processor 54 measures a maximum value $V_{adc\_max}$ and a minimum value $V_{adc\_min}$ associated with the digital signal from the AD converter 53, decides the offset voltage Vos on the basis of an average value of the maximum value $V_{adc\_max}$ and the minimum value $V_{adc\_min}$, decides the amplitude A on the basis of a difference value between the maximum value $V_{adc\_max}$ and the minimum value $V_{adc\_min}$, and outputs, to the analog signal processor 52, the offset control signal Soc to be used for canceling the decided offset voltage Vos and the gain control signal Sgc to be used for controlling the decided amplitude A such that it lies within the allowable input range for the AD converter 53.

The offset controller 64 is configured so that an internal resistance value varies with the offset control signal Soc and the offset canceling voltage $V_{REF}+V_c$ is generated according to the variable resistance value.

Figure 7:
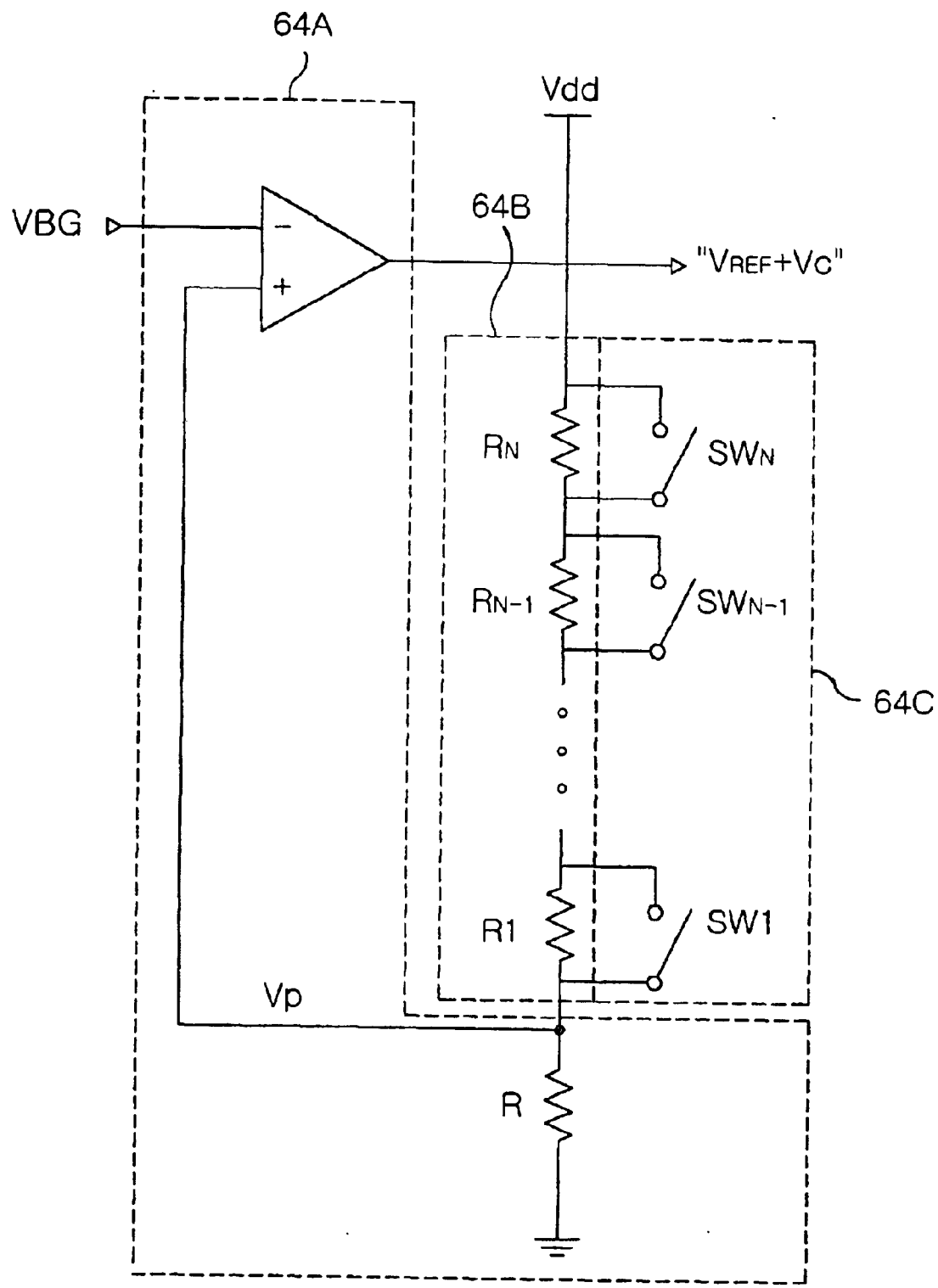
FIG. 7 is a circuit diagram illustrating an offset controller shown in FIG. 6.

FIG. 7 is a circuit diagram illustrating the offset controller 64 shown in FIG. 6.

Referring to FIG. 7, the offset controller 64 includes an operational amplifier 64A having an inversion input terminal for receiving a bandgap reference voltage (VBG) being a base voltage, an non-inversion input terminal coupled to the ground through a resistor R, and an output terminal coupled to a supply voltage VDD; a resistor chain 64B having a plurality of resistors R1~RN coupled between the output terminal and non-inversion terminal of the operational amplifier 64A in series; and a switching unit 64C having a plurality of switches SW1~SWN that are coupled to each of the resistors R1~RN in parallel, respectively, and are turned on/off in response to the offset control signal. The AGC amplifier 65 amplifies the input signals on the basis of a gain decided upon by its specific resistance value and a variable resistance value varying with the gain control signal.

Figure 8:
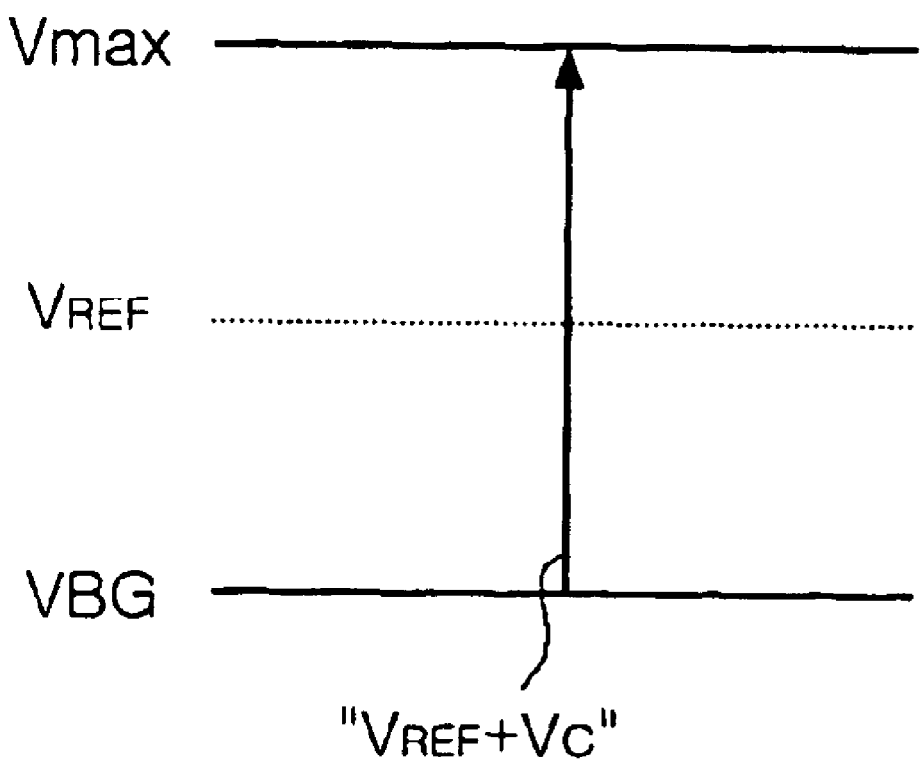
FIG. 8 is an explanatory view illustrating a variable range of a voltage $V_{REF}+V_c$ for canceling an offset shown in FIG. 7.

FIG. 8 is an explanatory view illustrating a variable range of the offset canceling voltage $V_{REF}+V_c$ shown in FIG. 7.

Referring to FIG. 8, variation of the offset canceling voltage $V_{REF}+V_c$ ranges from the base voltage (VBG) to the maximum voltage Vmax.

Figure 9:
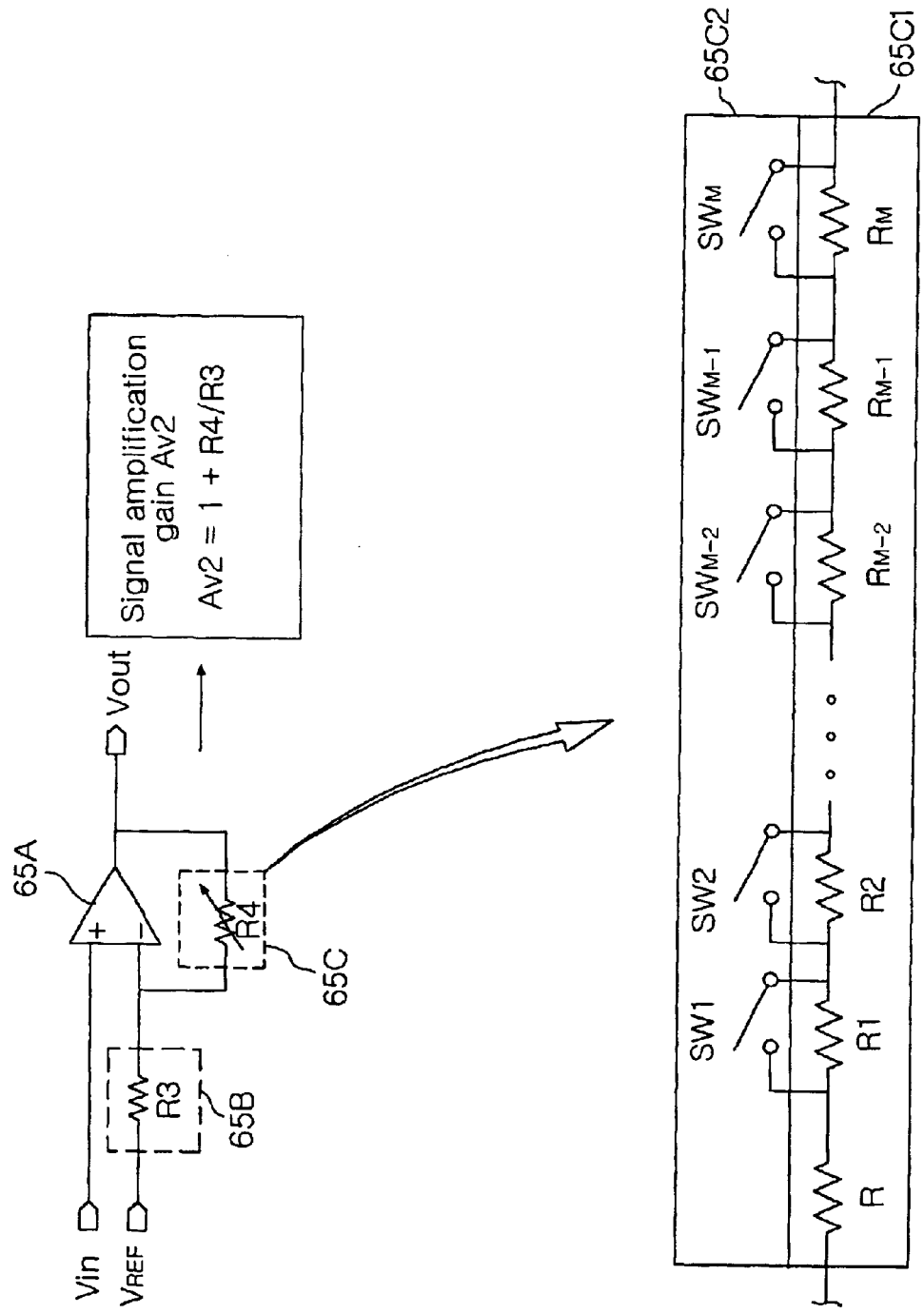
FIG. 9 is a circuit diagram illustrating an automatic gain control (AGC) amplifier shown in FIG. 6.

FIG. 9 is a circuit diagram illustrating the AGC amplifier 65 shown in FIG. 6.

Referring to FIG. 9, the AGC amplifier 65 includes an operational amplifier 65A, an input resistor 65B and a feedback resistor unit 65C. The operational amplifier 65A includes a non-inversion input terminal for receiving a signal from the low pass filter 63, an inversion input terminal for receiving a reference voltage $V_{REF}$ from a reference voltage terminal, and an output terminal. The input resistor 65B is coupled between the inversion input terminal of the operational amplifier 65A and the reference voltage terminal of the reference voltage $V_{REF}$. The feedback resistor unit 65C is coupled between the inversion input terminal and the output terminal of the AGC amplifier 65A, and its resistance value varies with the gain control signal. At this time, the operational amplifier 65A amplifies the input signals on the basis of a gain decided upon by its resistance value and the resistance value of the feedback resistor unit 65C.

The feedback resistor unit 65C of the AGC amplifier 65 includes a resistor chain 65C1 having a plurality of resistors R and R1~RM coupled in series and a switching unit 65C2 having a plurality of switches SW1~SWM. Each of the switches SW1~SWM is coupled to each of the resistors R1~RM of the resistor chain 65C1 in parallel, and is turned on/off in response to the gain control signal Sgc.

Figure 10A:
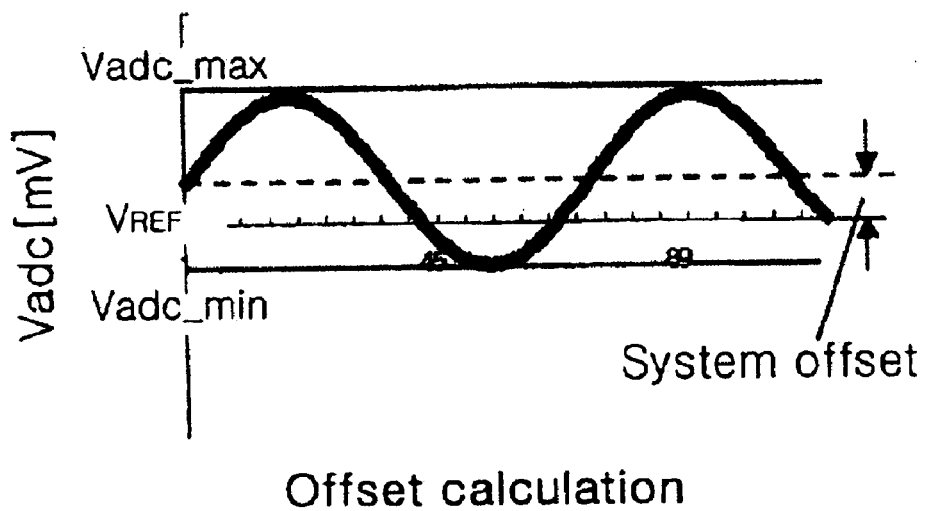
FIGS. 10(a) and 10(b) are waveforms illustrating a signal having an offset and a signal after offset calibration.
Figure 10B:
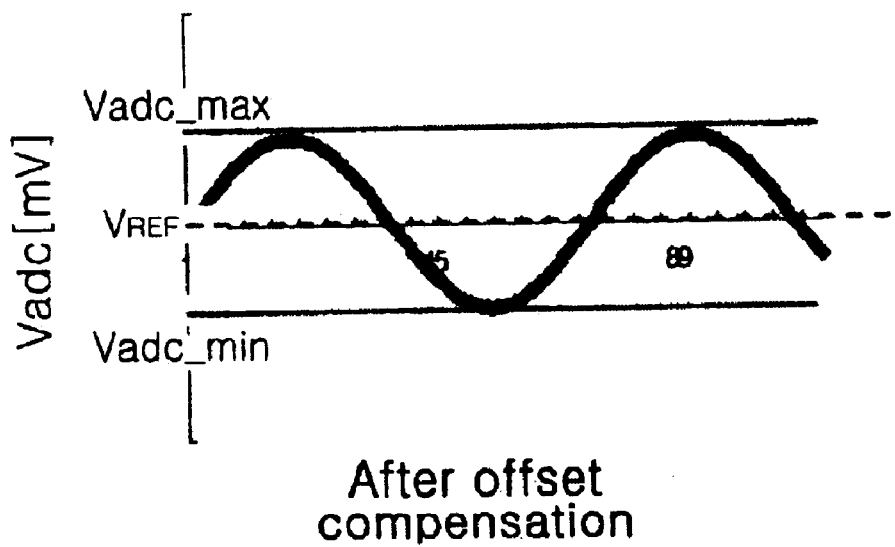

FIGS. 10(a) and 10(b) are waveforms illustrating a signal having an offset and a signal after offset calibration. FIG. 10(a) is a waveform diagram illustrating input voltages having the offset inputted into the AD converter, and FIG. 10(b) is a waveform diagram illustrating input voltages inputted into the AD converter after offset calibration.

Next, operations and advantageous effects of the present invention will be described in detail with reference to FIGS. 5 to FIGS. 10(a) and 10(b).

Referring to FIG. 5, the signal processor for use in the electronic compass of the present invention processes signals from a geomagnetic compass sensor 51 detecting sine or cosine wave signals induced by a drive signal according to an azimuth angle. The signal processor includes an analog signal processor 52, an analog/digital (AD) converter 53 and a digital signal processor 54.

The analog signal processor 52 amplifies signals Sx and Sy, cancels an offset voltage Vos generated during an amplification process in response to the offset control signal Soc, and controls the amplitude A of a signal in which the offset voltage Vos is cancelled in response to the gain control signal Sgc such that the signal amplitude A lies within the allowable input range.

The AD converter 53 converts analog signals $V_{adc}$ (Vadcx and Vadcy) from the analog signal processor 52 into a digital signal.

The digital signal processor 54 measures maximum and minimum values associated with the digital signal from the AD converter 53, decides the offset voltage Vos and the amplitude A on the basis of the maximum and minimum values, and outputs, to the analog signal processor 52, the offset control signal Soc to be used for canceling the decided offset voltage Vos and the gain control signal Sgc to be used for controlling the decided amplitude A such that it lies within the allowable input range for the AD converter 53.

An analog signal processing circuit of the analog signal processor 52 will be described in detail with reference to FIG. 6.

Referring to FIG. 6, the chopper 61 contained in the analog signal processing circuit of the analog signal processor 52, detects signals Sx or Sy from the geomagnetic compass sensor 51. The input amplifier 62 amplifies signals outputted from the chopper 61 on the basis of a preset gain. The low pass filter 63 carries out a preset low pass filtering operation for a signal outputted from the input amplifier 62. The offset controller 64 generates a voltage $V_{REF}+V_c$ for canceling the offset in response to the offset control signal Soc and provides the generated voltage $V_{REF}+V_c$ to input terminals of the input amplifier 62. The AGC amplifier 65 sets an amplification gain Av in response to the gain control signal Sgc and amplifies a signal from the low pass filter 63 in response to the set gain Av.

The voltage $V_{adc}$ outputted from the analog signal processor 52 to the AD converter 53 is expressed in the following Equations 2 and 3.

$$V_{adc} = \left(1 + \frac{R_4}{R_3}\right) * \left[\frac{R_2}{R_1} * (V_{N1} - V_{N2}) + V_{REF} + \right. \qquad \text{Equation 2}$$
$$\left. V_c - \left(1 + \frac{R_2}{R_1}\right) * V_{OS1} - V_{OS2}\right] - \frac{R_4}{R_3} * V_{REF}$$

$$V_{adc} = \left(1 + \frac{R_4}{R_3}\right) * \frac{R_2}{R_1} * (V_{N1} - V_{N2}) + V_{REF} + \qquad \text{Equation 3}$$
$$\left(1 + \frac{R_4}{R_3}\right) V_c - \left(1 + \frac{R_4}{R_3}\right)\left[\left(1 + \frac{R_2}{R_1}\right) * V_{OS1} - V_{OS2}\right]$$

Assuming that the voltage $V_c$ varying with the offset control signal for allowing the offset controller 64 to cancel the offset voltage, and offset voltages Vos ($V_{os1}$ and $V_{os2}$) are zero in the above Equation 3, the voltage $V_c$ is expressed as the following Equation 4, and the voltage $V_{adc}$ in which the offset voltages are cancelled is expressed as the following Equation 5.

$$V_c = \left(1 + \frac{R_2}{R_1}\right) * V_{OS1} - V_{OS2} \qquad \text{Equation 4}$$

$$V_{adc} = \left(1 + \frac{R_4}{R_3}\right) * \frac{R_2}{R_1} * (V_{N1} - V_{N2}) + V_{REF} \qquad \text{Equation 5}$$

Figure 3A:
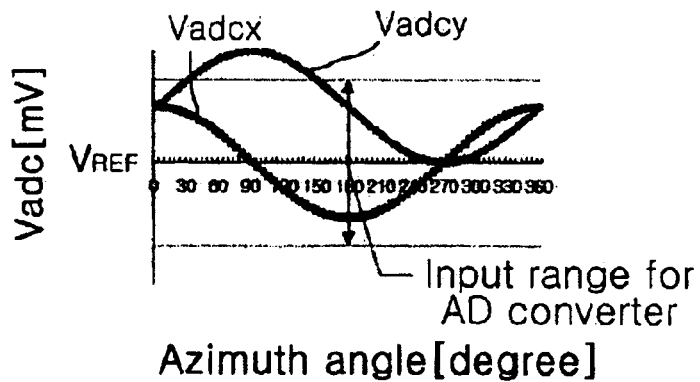
FIGS. 3(a), 3(b) and 3(c) are waveform diagrams illustrating an offset occurrence, offset calibration and azimuth-angle error occurrence associated with the input signals.
Figure 3B:
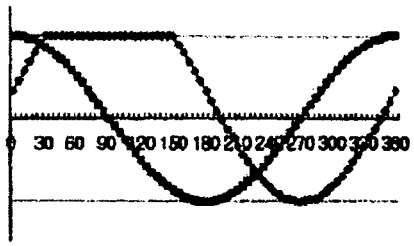
Figure 3C:
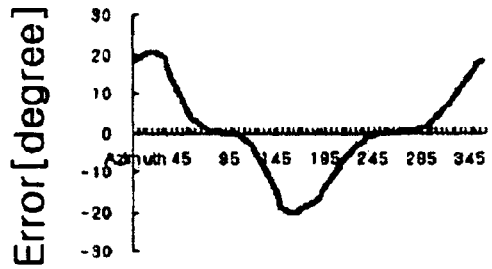

Referring to FIG. 6, the offset voltages Vos ($V_{os1}$ and $V_{os2}$) of several tens of mVs can occur due to a mismatch stemming from a semiconductor manufacturing process and design in the cases of the input amplifier (Amp1) 62 and the AGC amplifier (Amp2) 65. When the offset voltages Vos ($V_{os1}$ and $V_{os2}$) are amplified to a large gain and applied to a system, the azimuth angle error occurs as shown in FIG. 3(a).

The digital signal processor 54 measures a maximum value $V_{adc\_max}$ and a minimum value $V_{adc\_min}$ associated with the digital signal from the AD converter 53, decides the offset voltage Vos on the basis of an average value of the maximum value $V_{adc\_max}$ and the minimum value $V_{adc\_min}$, decides the amplitude A on the basis of a difference value between the maximum value $V_{adc\_max}$ and the minimum value $V_{adc\_min}$, and outputs, to the analog signal processor 52, the offset control signal Soc to be used for canceling the decided offset voltage Vos and the gain control signal Sgc to be used for controlling the decided amplitude A such that it lies within the allowable input range for the AD converter 53.

If the offset controller 64 adjusts the voltage $V_c$ so that the above Equation 4 can be satisfied, no offset voltage occurs since the analog signal processor amplifies a magnetic signal on the basis of the direct voltage $V_{REF}$. In order for a value of the voltage $V_c$ to be obtained, the maximum value $V_{adc\_max}$ and minimum value $V_{adc\_min}$ of the voltage $V_{adc}$ are first measured when an electronic compass module is turned once or more. Then, an average value of the maximum value $V_{adc\_max}$ and the minimum value $V_{adc\_min}$ is subtracted from the value of the reference voltage $V_{REF}$, such that a subtraction value is produced. The value of the voltage Vc is obtained by dividing the subtraction value by an amplification gain Av2 of the AGC amplifier 65. The voltage $V_c$ is given by the following Equation 6.

$$V_c = \left[V_{REF} - \frac{(V_{adc\_max} + V_{adc\_min})}{2}\right] * \frac{1}{Av2} \qquad \text{Equation 6}$$

The value of the voltage $V_c$ calculated by the above Equation 6 is converted into a digital value. The digital signal processor 54 registers the offset control signal Soc in an offset control register, and the registered offset control signal is inputted into the offset controller 64. The offset controller 64 generates the offset cancellation voltage $V_{REF}+V_c$ and provides the generated voltage $V_{REF}+V_c$ to the input terminal of the input amplifier 62 so that a system offset can be cancelled out.

Next, a process for calculating amplitude (Vp-p) will be described. First, the maximum value $V_{adc\_max}$ and minimum value $V_{adc\_min}$ of the voltage $V_{adc}$ are first obtained when the electronic compass module is turned once or more. The amplitude (Vp-p) A is obtained as a difference value (Vp-p_current=$V_{adc\_max}-V_{adc\_min}$) between the maximum value $V_{adc\_max}$ and the minimum value $V_{adc\_min}$. The amplitude (Vp-p_current) A is converted into a digital value, and a target gain $Gain_{target}$ is calculated from the digital vale. A value of the target gain $Gain_{target}$ is registered as the gain control signal Sgc in a gain control register. The gain control signal controls a variable resistor R4 of the AGC amplifier 65 and an amplification gain of the AGC amplifier 65 is adjusted.

Referring to FIG. 7, the offset controller 64 generates the offset cancellation voltage $V_{REF}+V_c$ according to a value of the variable resistor R4 varying with the offset control signal Soc. This voltage generation operation will be described in detail.

Each of the switches SW1~SWN of the switching unit 64C contained in the offset controller 64 is turned on/off in response to the offset control signal Soc. A sum of resistance values of resistors of the resistor chain 64B corresponding to turned-off switches is decided. A voltage increased according to the sum of the resistance values from the base voltage (VBG) inputted into the operational amplifier 64A is generated as the offset cancellation voltage $V_{REF}+V_c$.

The offset controller 64 will be described in detail with reference to FIG. 7.

A feedback control operation is carried out so that voltages at both ends of the operational amplifier 64A shown in FIG. 7 are the same as each other. At this time, a base voltage VBG=Vp=I*R is generated according to the current I flowing to the resistor R. The base voltage (VBG) is constant even when a supply voltage or temperature varies.

In FIG. 7, a value of the current I is constantly maintained, and the voltage $V_{REF}+V_c$ for canceling the system offset is obtained as in the following Equation 7.

$$V_{REF} + V_C = I * (RN + RN - 1 + RN - 2 + RN - 3 \ldots R1 + R) \qquad \text{Equation 7}$$
$$= I * R + I * (RN + RN - 1 + RN - 2 + RN - 3 \ldots + R1)$$
$$= VBG + I * (RN + RN - 1 + RN - 2 + RN - 3 \ldots + R1)$$

In the above Equation 7, the offset control signal Soc consists of N bits so that each of the switches SW1~SWN coupled to each of the resistors R1~RN in parallel is turned on/off according to each set bit. As each of the switches SW1~SWN is turned on/off according to each set bit, the offset cancellation voltage $V_{REF}+V_c$ can be adjusted.

In the above Equation 7, R2=2*R1, R3=2*R2=4*R1, etc. can be set in relation to the resistors RN, RN−1, RN−2, . . . , R1 of the resistor chain 64B so that the equation RN= $2^{N-1}$*R1 is satisfied. Optionally, the resistors RN, RN−1, RN−2, . . . , R1 can be set so that they can have the same value as each other.

FIG. 8 is an explanatory view illustrating a variable range of the voltage $V_{REF}+V_c$ for canceling the offset.

Referring to FIG. 8, variation of the offset cancellation voltage $V_{REF}+V_c$ ranges from the base voltage (VBG) to the maximum voltage Vmax. Here, a value of the base voltage (VBG) is smaller than that of the voltage $V_{REF}$. As an example, the value of the base voltage (VBG) is approximately $V_{REF}/2$. A value of the maximum voltage Vmax is larger than that of the voltage $V_{REF}$. As an example, the value of the maximum voltage Vmax is approximately 1.5 $V_{REF}$.

The AGC amplifier 65 amplifies the input signals on the basis of a gain decided upon by its specific resistance value and a variable resistance value varying with the gain control signal. The AGC amplifier 65 will be described with reference to FIG. 9.

A resistance value of the feedback resistor unit 65C of the AGC amplifier 65 varies with the gain control signal, and the amplification gain Av is decided according to the variable resistance value and the resistance value of the input resistor 65B. The AGC amplifier 65 amplifies a signal from the low pass filter 63 on the basis of the decided amplification gain.

Each of the switches SW1~SWM of the switching unit 65C2 contained in the feedback resistor unit 65C of the AGC amplifier 65 is turned on/off in response to the gain control signal Sgc. At this time, a resistor R4 corresponding to a value of a sum of resistors of the resistor chain 65C1 contained in the AGC amplifier 65 associated with the turned-off switches is decided.

The resistance value of the resistor R4 for controlling the gain of the AGC amplifier 65 is calculated by the following Equation 8.

$$R4=R+(R1+R2+R3+ \ldots +RN-2+RN-1+RM) \quad \text{Equation 8}$$

The gain control signal Sgc controls an on/off operation of each of the switches SW1~SWM of the switching unit 65C2 coupled to each of the resistors R1~RM of the resistor chain 65C1 contained in the feedback resistor unit 65C for controlling the gain of the AGC amplifier 65 in parallel. As the gain control signal Sgc allows each of the switches SWN~SW1 to be turned on/off according to each set bit registered in the gain control register consisting of the N bits, the resistance value of the resistor R4 can be adjusted.

As an example, if R2=3*R3, R1=0.25*R3, etc. are set in the resistor chain 65C1 so that the equation RN=$2^{N-1}$*R1 is satisfied, a gain can be controlled by a multiple of 0.25. At this time, the amplification gain Av2 of the AGC amplifier 65 is given by the equation Av2=1+(3+0.25*GC) where GC denotes a reference gain.

The operation of the AGC amplifier 65 will now be described. The output amplitude shown in FIG. 10(*b*) is defined by Vp-p=$V_{adc\_max}$−$V_{adc\_min}$. Typically, when an external magnetic field is not present, a magnetic field has an intensity value of approximately 0.3 Gauss. However, when an external magnetic field is present or the sensor is tilted, a magnetic field intensity of approximately 1 Gauss can be applied to the sensor.

Figure 4A:
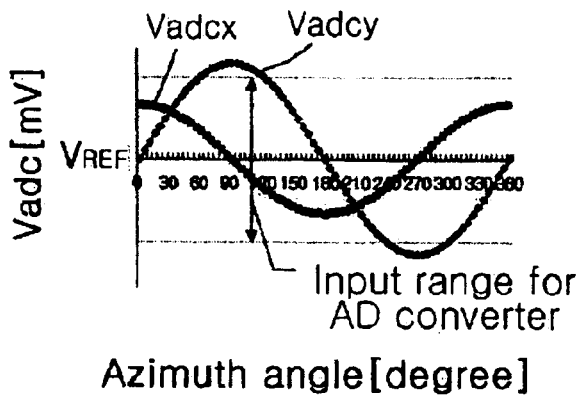
FIGS. 4(a), 4(b) and 4(c) are waveform diagrams illustrating gain error occurrence, error correction and azimuth-angle error occurrence associated with the input signals.
Figure 4B:
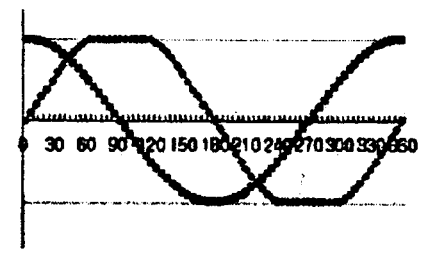
Figure 4C:
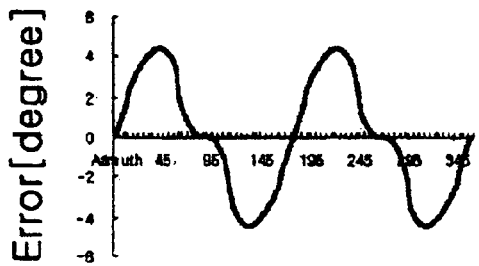

When the sensor tilt is considered, a range of the voltage must have a value of ⅓ of the reference voltage $V_{adc\_REF}$ for the AD converter. Otherwise, a waveform shown in FIG. 4(*a*) can be generated as in the prior art. A calibration process is carried out when calculating an azimuth angle so that a voltage value Vp-p for the X or Y axis is within the allowable input range. As the range of the voltage Vp-p for the X or Y axis varies, an error is increased during the calibration process. For this reason, the voltage Vp-p must be adjusted so that it can be outputted as a value of ⅓*$V_{adc\_REF}$ or less.

The present invention as described above is applied to a signal processor for carrying out an A/D conversion operation for two-axis sensing signals from a geomagnetic compass sensor.

As apparent from the above description, the present invention provides a signal processor for use in an electronic compass, which can maintain levels of signals to be inputted into an analog/digital (AD) converter through offset and gain control operations within a reference voltage range by controlling an offset voltage generated while processing analog signals and automatically controlling a signal amplification gain, be applicable to performing a tilt compensation operation for a sensor, improve sensor performance by carrying out a gain control operation for signals from a geomagnetic compass sensor and minimize an error when calculating an azimuth angle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A signal processor for use in an electronic compass for processing signals from a geomagnetic compass sensor detecting sine or cosine wave signals induced by a drive signal according to an azimuth angle, said signal processor comprising:

an analog signal processor for amplifying the signals from the geomagnetic compass sensor, canceling an offset voltage generated during an amplification process in response to an offset control signal, and controlling an amplitude of a signal in which the offset voltage is cancelled out in response to a gain control signal;

an analog/digital (AD) converter for converting analog signals from the analog signal processor into a digital signal; and a digital signal processor for measuring a maximum value and a minimum value associated with the digital signal from the AD converter, determining the offset voltage and the amplitude on the basis of the maximum and minimum values, and outputting, to the analog signal processor, the offset control signal to be used for canceling the determined offset voltage and the gain control signal to be used for controlling the determined amplitude so that the amplitude lies within an allowable input range for the AD converter;

wherein the analog signal processor comprises:

a chopper for detecting the signals from the geomagnetic compass sensor;

an input amplifier for amplifying the detected signals output from the chopper on the basis of a preset gain;

a low pass filter for carrying out a preset low pass filtering operation for a signal output from the input amplifier;

an offset controller for generating a canceling voltage for canceling the offset voltage in response to the offset control signal and providing the generated canceling voltage to input terminals of the input amplifier; and an automatic gain control (AGC) amplifier for setting an amplification gain in response to the gain control signal and amplifying a signal from the low pass filter in response to the set amplification gain.

2. The signal processor as set forth in claim 1, wherein the digital signal processor:

measures the maximum value and the minimum value associated with the digital signal from the AD converter;

determines the offset voltage on the basis of an average value of the maximum value and the minimum value;

determines the amplitude on the basis of a difference value between the maximum value and the minimum value; and outputs, to the analog signal processor, the offset control signal to be used for canceling the determined offset voltage and the gain control signal to be used for controlling the determined amplitude so that the amplitude lies within the allowable input range for the AD converter.

3. The signal processor as set forth in claim 1, wherein the offset controller is configured to have an internal resistance value that varies with the offset control signal and wherein the canceling voltage is generated according to the variable internal resistance value.

4. The signal processor as set forth in claim 1, wherein the offset controller comprises:

an operational amplifier having an inversion input terminal for receiving a base voltage, a non-inversion input terminal coupled to ground through a resistor, and an output terminal coupled to a supply voltage;

a resistor chain having a plurality of resistors coupled in series between the output terminal and the non-inversion terminal of the operational amplifier; and a switching unit having a plurality of switches each of which is coupled in parallel to one of the resistors of the resistor chain and are and is turned on/off in response to the offset control signal.

5. The signal processor as set forth in claim 1, wherein the AGC amplifier amplifies the signal from the low pass filter on the basis of the amplification gain defined by a specific resistance value of said AGC amplifier and a variable resistance value varying with the gain control signal.

6. The signal processor as set forth in claim 1, wherein the AGC amplifier comprises:

an operational amplifier having a non-inversion input terminal for receiving the signal from the low pass filter, an inversion input terminal for receiving a reference voltage from a reference voltage terminal and an output terminal;

an input resistor coupled between the inversion input terminal of the operational amplifier and the reference voltage terminal of the reference voltage; and a feedback resistor unit coupled between the inversion input terminal and the output terminal of the AGC amplifier;

wherein the operational amplifier amplifies the signal from the low pass filter on the basis of the amplification gain defined by a resistance value of the input resistor and a resistance value of the feedback resistor unit.

7. The signal processor as set forth in claim 6, wherein the feedback resistor unit of the AGC amplifier comprises:

a resistor chain having a plurality of resistors coupled in series; and a switching unit having a plurality of switches, each of the switches being coupled in parallel to one of the resistors of the resistor chain and being turned on/off in response to the gain control signal.

8. A signal processor for use in an electronic compass for processing a signal from a geomagnetic compass sensor, said signal processor comprising:

a chopper for detecting the signal from the geomagnetic compass sensor, an input amplifier having an input coupled to an output of said chopper for receiving the signal detected by said chopper and for amplifying the detected signal;

an offset controller having an output coupled to the input of said input amplifier for applying, in response to an offset control signal, a canceling voltage to the input of said input amplifier to cancel out an offset voltage generated during an amplifying process of said input amplifier;

a low pass filter having an input coupled to an output of said input amplifier for receiving the signal amplified by said input amplifier and for filtering the amplified signal;

an automatic gain control (AGC) amplifier having an input coupled to an output of said low pass filter for receiving the signal filtered by said low pass filter, setting an amplification gain in response to a gain control signal, and amplifying the filtered signal using the set amplification gain;

an analog/digital (AD) converter having an input coupled to an output of said AGC amplifier for receiving the signal which has been amplified by said ACG amplifier and which is analog, and converting the analog signal into a digital signal; and a digital signal processor an input coupled to an output of said AD converter for receiving the digital signal, determining a maximum value and a minimum value associated with the digital signal, determining the offset voltage and an amplitude of the analog signal based on the maximum and minimum values, and, based on the determined offset voltage and amplitude, outputting the offset control signal to said offset controller so as to cancel the offset voltage and the gain control signal to said AGC amplifier so as to control the amplitude of the analog signal within an allowable input range of the AD converter.

9. The signal processor as set forth in claim 8, wherein said digital signal processor is configured to determine the offset voltage based on an average value of the maximum value and the minimum value, and to determine the amplitude of the analog signal based on a difference value between the maximum value and the minimum value.

10. The signal processor as set forth in claim 8, wherein said offset controller is configured to have a variable internal resistance value that varies with the offset control signal and wherein the canceling voltage is generated by said offset controller based on the variable internal resistance value.

11. The signal processor as set forth in claim 8, wherein said offset controller comprises:

an operational amplifier having an inversion input terminal for receiving a base voltage, a non-inversion input terminal grounded through a resistor, and an output terminal coupled to a supply voltage;

a resistor chain having a plurality of resistors coupled in series between the output terminal and the non-inversion terminal of the operational amplifier; and a switching unit having a plurality of switches each of which is coupled in parallel to one of the resistors of the resistor chain and is turned on or off in response to the offset control signal.

12. The signal processor as set forth in claim 8, wherein the AGC amplifier is configured to set the amplification gain based on a resistance value of said AGC amplifier and a variable resistance value varying with the gain control signal.

13. The signal processor as set forth in claim 8, wherein the AGC amplifier comprises:

an operational amplifier having a non-inversion input terminal coupled to the output of said low pass filter for receiving the filtered signal, an inversion input terminal for receiving a reference voltage from a reference voltage terminal, and an output terminal;

an input resistor coupled between the inversion input terminal of the operational amplifier and the reference voltage terminal; and a feedback resistor unit coupled between the inversion input terminal and the output terminal of the AGC amplifier;

wherein the amplification gain is defined by a resistance value of the input resistor and a variable resistance value of the feedback resistor unit, said variable resistance value varying with the gain control signal.

14. The signal processor as set forth in claim 13, wherein the feedback resistor unit of the AGC amplifier comprises:

a resistor chain having a plurality of resistors coupled in series; and a switching unit having a plurality of switches, each of which is coupled in parallel to one of the resistors of the resistor chain and is turned on or off in response to the gain control signal.

15. A signal processor for use in an electronic compass for processing signals from a geomagnetic compass sensor detecting sine or cosine wave signals induced by a drive signal according to an azimuth angle, said processor comprising:

an analog signal processor for amplifying the signals from the geomagnetic compass sensor, canceling an offset voltage generated during an amplification process in response to an offset control signal, and controlling an amplitude of a signal in which the offset voltage is cancelled out in response to a gain control signal;

an analog/digital (AD) converter for converting analog signals from the analog signal processor into a digital signal; and a digital signal processor for measuring a maximum value and a minimum value associated with the digital signal from the AD converter, determining the offset voltage and the amplitude based on the maximum and minimum values, and outputting, to the analog signal processor, the offset control signal to be used for canceling the determined offset voltage and the gain control signal to be used for controlling the determined amplitude so that the determined amplitude lies within an allowable input range for the AD converter;

wherein the digital signal processor:

measures the maximum value and the minimum value associated with the digital signal from the AD converter;

determines the offset voltage based on an average value of the maximum value and the minimum value;

determines the amplitude based on a difference value between the maximum value and the minimum value; and outputs, to the analog signal processor, the offset control signal to be used for canceling the determined offset voltage and the gain control signal to be used for controlling the determined amplitude so that the amplitude lies within the allowable input range for the AD converter.

* * * * *